United States Patent Office 3,532,883
Patented Oct. 6, 1970

3,532,883
MOISTURE DETERMINATION IN SOLIDS BY NEUTRON RADIATION
Heinrich Dresia, Essen, Reinhold Bessing, Wulfrath-Rhodenhaus, Peter Fischotter, Hamburg-Rissen, and Wigand Lunau, Wulfrath, Germany, assignors to Rheinische Kalksteinwerke G.m.b.H., Wulfrath, Germany
Filed Mar. 27, 1967, Ser. No. 626,191
Claims priority, application Germany, Mar. 26, 1968, R 43,494
Int. Cl. G01t 3/00
U.S. Cl. 250—83.1       8 Claims

ABSTRACT OF THE DISCLOSURE

An apparatus is disclosed for determining the moisture content of solid substances by means of fast neutrons which are slowed down by interaction with the hydrogen atoms of the water contained in the solid substance and with a hydrogen-containing reflector whereby the neutron counter is shielded against the thermal neutrons emanating from the reflector. Neutron source and counter are disposed as unit outside the solid substance in a cavity partially formed by that substance.

---

Figure 1:
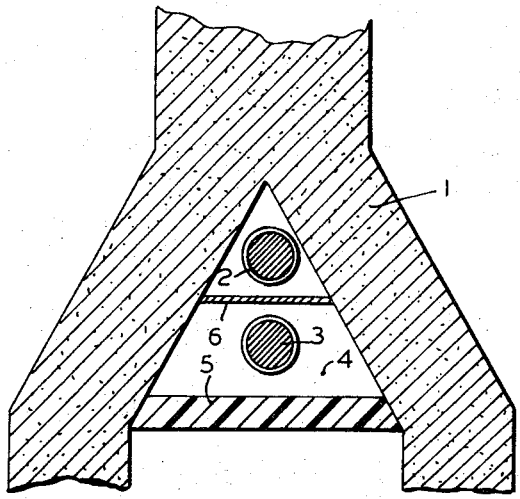

The present invention relates to apparatus for determining the moisture content of solid substances by means of elastically scattered neutron radiation.

In U.S. application Ser. No. 314,060, now Pat. 3,350,561 assigned to the same assignee, some of us have disclosed and claimed an apparatus which comprises a fast neutron source, a thermal neutron counting device proximately located to said neutron source, a container for the solid substance under examination located a substantial distance away and at least partially bounding the neutron source and neutron counting device. A hydrogen-containing reflecting material capable of reflecting neutron radiation abuts and only partially bounds said container at a location remote from the neutron source and the neutron counting device whereby a portion of the fast neutrons emanating from the neutron source are slowed, by interaction with the substance under examination and the reflecting material, to thermal neutrons which are detected by the neutron counting device.

Suitable hydrogen-containing reflecting materials are, e.g., hydrocarbons such as paraffin, synthetic resinous materials such as polyethylene, hydraulic binders such as concrete, and others. Preferably, said renflecting material is in abutment with only a portion of the external surface adjacent the fast neutron source so that an increased number of the thermal neutrons is reflected to the counting device to provide an optimum counting range.

The combination of neutron source and neutron counter is arranged in a cavity which has a considerably larger volume than the dimensions of said combination. The cavity is wholly or partially formed by parts of said container. Preferably, the combination of neutron source and neutron counter is disposed in the cavity as remote as possible from the solid substance. The containers may be in the form of chutes, tubes, shafts or belt conveyors. The reflector can be used as shield towards the outside.

Neutron sources having a relatively long life time, such as RaBe or Pu$^{239}$Be but also shorter-lived sources such as PoBe may be used.

As neutron counting device, we use preferably a device having an enrichment of B-10. Higher sensitivity to thermal neutrons is thus obtained while the necessary intensity of the neutron source can, in turn, be reduced.

In further development of application the apparatus of Ser. No. 314,060 we have found that it is of great advantage to shield the counter against the reflector by a material absorbing thermal neutrons.

Preferred shielding materials are cadmium, boron, gadolinium, and compounds or alloys of said elements. Additional alloying elements are, e.g., iron or aluminum.

Our invention makes it possible to absorb thermal neutrons reflected directly from the reflector onto the counter by means of the shield so as to prevent their registration by the counter tube. On the other hand, the thermal neutrons reflected from the solid substance whose moisture content shall be determined, are picked up by the counter because the shield is effective only against the reflector.

The invention lowers considerably the background while the measuring rate and sensitivity are considerably improved. For instance, when the moisture content of coke was determined with an apparatus according to the invention having a shielded counter tube, 2,500 pulses per unit of time were counted at 0% moisture, and 3,200 pulses at 3% moisture. Without the shield, the number of pulses per unit of time was 19,500 and 20,500, respectively. This comparison shows very clearly the improvement of the measuring sensitivity.

Instead of a conventional counter tube, other detectors for thermal neutrons can, of course, be used, such as scintillation counters, fission chambers, or ionization chambers. It is also possible to employ in a single apparatus several detectors and/or neutron sources.

The counter tube and neutron source can be arranged at a mutual distance of 0 up to a maximum of 20 cm. The distance of the measuring combination or its element from the material to be tested depends on the size of the particles or pieces of said material and on its volume. Generally, the measuring elements will be spaced about 5 to 20 cm. from the material to be tested.

Figure 2:
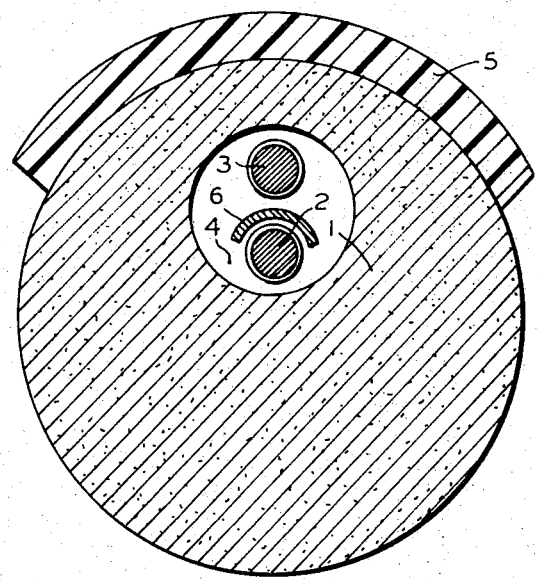
Figure 3:
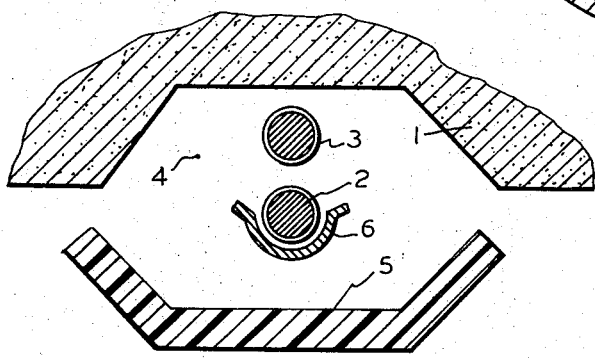

Several modes of carrying out the invention are shown diagrammatically for illustrative purposes in the accompanying drawing, wherein FIG. 1 is a sectional view of a moisture determining arrangement according to the invention inside a Y-funnel distributing the material from a vertical shaft to two stations;

FIG. 2 is a similar view of an apparatus arranged in a circular cavity inside a tubular conduit or shaft, where the reflectors partially surrounds the conduit, and FIG. 3 shows such arrangement in connection with a bin.

In all forms of arrangement illustrated, the loose solid material to be tested for moisture content is designated with the reference numeral 1. The neutron counter 2 and neutron source 3 are disposed in a cavity 4, and 5 denotes the hydrogen-containing reflector which, as stated in Ser. No. 314,060, may be paraffin. The counter tube 2 is shielded against the reflector 5 by the half-cylindrical cadmium shield 6 of about 1 mm. thickness.

We claim:
1. Apparatus for determining moisture content in solids by neutron radiation comprising in combination
   a source of fast neutrons;
   counter means for counting thermal neutrons;
   reflector means comprising a hydrogen-containing reflective material and disposed in relation to said source of fast neutrons and a solid so as to reflect fast neutrons from said source to the solid; and
   shield means for shielding said counter means from thermal neutrons, said shield means being disposed between said reflector means and said counter means to absorb thermal neutrons emanating from said reflector means to reduce background while permitting said counter means to determine moisture content of the solid by detection of thermal neutrons therefrom.

2. The apparatus as claimed in claim 1 wherein said shield means contains a member of the group consisting of cadmium, boron, gadolinium, and compounds and alloys of said elements.

3. The invention as recited in claim 1 wherein said source of fast neutrons, said counter means and said shield means are disposed in a space bounded at least partially by the solid, said space having a volume substantially greater than the volume of said source of fast neutrons and said counter means.

4. The invention as recited in claim 3 wherein said reflector means forms a boundary of said space.

5. The invention as recited in claim 3 wherein said reflector means is disposed outside of said space.

6. The invention as recited in claim 3 wherein the solid has a pair of legs forming a Y configuration, said space is substantially triangular and is disposed between the pair of legs of the solid, and said reflector means defines a boundary of said space.

7. The invention as recited in claim 3 wherein the solid has a circular configuration, said space is circular and said reflector is disposed at an outer edge of the solid.

8. The invention as recited in claim 3 wherein said space is cut out of the solid and said reflector means forms a boundary for said space.

References Cited

UNITED STATES PATENTS

| | | | |
|---|---|---|---|
| 2,879,402 | 3/1959 | Ferre | 250—83.1 X |
| 3,256,434 | 6/1966 | Carver et al. | 250—83.6 X |
| 3,106,535 | 10/1963 | Blanco | 250—108 X |

ARCHIE R. BORCHELT, Primary Examiner

D. L. WILLIS, Assistant Examiner

U.S. Cl. X.R.

250—83.6, 108